(12) United States Patent
Lakshmanamurthy et al.

(10) Patent No.: US 8,929,373 B2
(45) Date of Patent: Jan. 6, 2015

(54) SENDING PACKETS WITH EXPANDED HEADERS

(75) Inventors: Sridhar Lakshmanamurthy, Sunnyvale, CA (US); Mikal C. Hunsaker, El Dorado Hills, CA (US); Michael T. Klinglesmith, Portland, OR (US); Blaise Fanning, Folsom, CA (US); Rohit R. Verma, Fremont, CA (US); Robert P. Adler, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 13/248,234

(22) Filed: Sep. 29, 2011

(65) Prior Publication Data

US 2013/0083798 A1    Apr. 4, 2013

(51) Int. Cl.
| | | |
|---|---|---|
| *H04L 12/28* | (2006.01) | |
| *H04J 3/16* | (2006.01) | |
| *G06F 15/78* | (2006.01) | |
| *H04L 29/06* | (2006.01) | |

(52) U.S. Cl.
CPC ............ *G06F 15/7825* (2013.01); *H04L 69/22* (2013.01)
USPC .......................................... 370/392; 370/471

(58) Field of Classification Search
None
See application file for complete search history.

(56) References Cited

U.S. PATENT DOCUMENTS

| | | | |
|---|---|---|---|
| 5,493,566 A | 2/1996 | Ljungerg et al. | |
| 6,009,488 A | 12/1999 | Kavipurapu | |
| 6,233,632 B1 | 5/2001 | Meiyappan et al. | |
| 6,427,169 B1 | 7/2002 | Elzur | |
| 6,611,893 B1 | 8/2003 | Lee et al. | |
| 6,694,380 B1 | 2/2004 | Wolrich et al. | |
| 6,725,313 B1 | 4/2004 | Wingard et al. | |
| 6,810,460 B1 | 10/2004 | Kirkwood | |
| 6,816,938 B2 | 11/2004 | Edara et al. | |
| 7,065,733 B2 | 6/2006 | Goodnow et al. | |
| 7,457,905 B2 | 11/2008 | Gehman | |
| 7,506,089 B2 | 3/2009 | Cho et al. | |
| 7,573,295 B1 | 8/2009 | Stadler | |
| 7,613,902 B1 * | 11/2009 | Martin et al. | ................ 712/201 |
| 7,673,087 B1 | 3/2010 | Ansari et al. | |
| 7,685,346 B2 | 3/2010 | Teh | |

(Continued)

FOREIGN PATENT DOCUMENTS

| | | |
|---|---|---|
| KR | 10-2005-0077437 | 8/2005 |
| KR | 10-2005-0082834 | 8/2005 |
| WO | 2005071553 | 8/2005 |

OTHER PUBLICATIONS

Office Action mailed Jun. 7, 2013 with Reply filed Sep. 3, 2013, in U.S. Appl. No. 13/248,232.

(Continued)

*Primary Examiner* — Jutai Kao
(74) *Attorney, Agent, or Firm* — Trop, Pruner & Hu, P.C.

(57) ABSTRACT

In one embodiment, the present invention is directed to method for receiving a packet in a first agent, where the packet includes a first packet header with an expanded header indicator. Based on this indicator, the agent can determine if the packet includes one or more additional packet headers. If so, the agent can next determining if it supports information in the additional packet header based on a header identifier of the additional header. Other embodiments are described and claimed.

18 Claims, 12 Drawing Sheets

(56) References Cited

U.S. PATENT DOCUMENTS

| | | | |
|---|---|---|---|
| 7,725,757 B2 | 5/2010 | Mandhani et al. | |
| 7,734,856 B2 | 6/2010 | Reinig | |
| 7,783,819 B2 | 8/2010 | Mandhani | |
| 7,793,345 B2 | 9/2010 | Weber et al. | |
| 7,873,068 B2 | 1/2011 | Klinglesmith et al. | |
| 7,979,592 B1 | 7/2011 | Pettey et al. | |
| 7,990,999 B2 | 8/2011 | Lee | |
| 8,010,731 B2 | 8/2011 | Mandhani | |
| 8,023,508 B2 | 9/2011 | Horton | |
| 8,199,157 B2 | 6/2012 | Park et al. | |
| 8,225,019 B2 | 7/2012 | Asnaashari | |
| 8,286,014 B2 | 10/2012 | Han et al. | |
| 8,364,874 B1 | 1/2013 | Schlansker et al. | |
| 8,437,369 B2 | 5/2013 | Shaikli | |
| 8,443,422 B2 | 5/2013 | Weber et al. | |
| 2002/0038401 A1 | 3/2002 | Zaidi | |
| 2003/0088722 A1 | 5/2003 | Price | |
| 2003/0126336 A1 | 7/2003 | Creta | |
| 2004/0177176 A1 | 9/2004 | Li et al. | |
| 2005/0010687 A1 | 1/2005 | Dai | |
| 2005/0120323 A1 | 6/2005 | Goodnow et al. | |
| 2005/0137966 A1 | 6/2005 | Munguia et al. | |
| 2005/0177664 A1 | 8/2005 | Cho et al. | |
| 2005/0289369 A1 | 12/2005 | Chung et al. | |
| 2005/0289374 A1 | 12/2005 | Kim et al. | |
| 2006/0047849 A1 | 3/2006 | Mukherjee | |
| 2006/0140126 A1 | 6/2006 | Zhong | |
| 2006/0218336 A1 | 9/2006 | Ishizawa et al. | |
| 2007/0006108 A1 | 1/2007 | Bueti | |
| 2007/0067549 A1 | 3/2007 | Gehman | |
| 2008/0059441 A1 | 3/2008 | Gaug et al. | |
| 2008/0082840 A1 | 4/2008 | Kendall et al. | |
| 2008/0147858 A1 | 6/2008 | Prakash et al. | |
| 2008/0163005 A1 | 7/2008 | Sonksen et al. | |
| 2008/0235415 A1 | 9/2008 | Clark et al. | |
| 2008/0288689 A1 | 11/2008 | Hoang et al. | |
| 2008/0310458 A1 | 12/2008 | Rijpkema | |
| 2009/0119432 A1 | 5/2009 | Lee et al. | |
| 2009/0235099 A1 | 9/2009 | Branover et al. | |
| 2009/0249098 A1 | 10/2009 | Han et al. | |
| 2009/0296624 A1* | 12/2009 | Ryu et al. | 370/312 |
| 2009/0296740 A1 | 12/2009 | Wagh | |
| 2010/0199010 A1 | 8/2010 | Goren et al. | |
| 2010/0220703 A1* | 9/2010 | Farrugia et al. | 370/338 |
| 2010/0262855 A1 | 10/2010 | Buch et al. | |
| 2010/0278195 A1 | 11/2010 | Wagh | |
| 2011/0047272 A1 | 2/2011 | Bosneag | |
| 2011/0078315 A1 | 3/2011 | Matsushita et al. | |
| 2011/0078356 A1 | 3/2011 | Shoemaker | |
| 2011/0093576 A1 | 4/2011 | Cherian et al. | |
| 2011/0179248 A1 | 7/2011 | Lee | |
| 2012/0051297 A1* | 3/2012 | Lee et al. | 370/329 |
| 2012/0066468 A1 | 3/2012 | Nakajima et al. | |
| 2012/0079590 A1 | 3/2012 | Sastry et al. | |
| 2012/0233514 A1 | 9/2012 | Patil et al. | |
| 2012/0311213 A1 | 12/2012 | Bender et al. | |
| 2013/0054845 A1* | 2/2013 | Nimmala et al. | 710/36 |
| 2013/0089095 A1* | 4/2013 | Chen et al. | 370/392 |

OTHER PUBLICATIONS

Office Action mailed Jun. 20, 2013 with Reply filed Sep. 18, 2013, in U.S. Appl. No. 13/248,243.

Office Action mailed Apr. 23, 2013 with Reply filed Jul. 22, 2013, in U.S. Appl. No. 13/248,263.

Office Action mailed Jun. 14, 2013 with Reply filed Sep. 9, 2013, in U.S. Appl. No. 13/248,270.

Office Action mailed Jun. 20, 2013 with Reply filed Sep. 17, 2013, in U.S. Appl. No. 13/248,276.

Office Action mailed Sep. 18, 2013, in U.S. Appl. No. 13/248,252.

Intel Corporation, "An Introduction to the Intel QuickPath Interconnect," Jan. 2009, pp. 1-22.

Sousek, et al., "PCI Express Core Integration with the OCP Bus," CAST, Inc., 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

U.S. Appl. No. 13/248,232, filed Sep. 29, 2011, entitled, "Common Idle State, Active State and Credit Management for an Interface", by Sridhar Lakshmanamurthy, et al..

U.S. Appl. No. 13/248,243, filed Sep. 29, 2011, entitled, "Aggregating Completion Messages in a Sideband Interface", by Sridhar Lakshmanamurthy, et al.

U.S. Appl. No. 13/248,252, filed Sep. 29, 2011, entitled, "Providing Error Handling Support to Legacy Devices", by Sridhar Lakshmanamurthy, et al.

U.S. Appl. No. 13/248,263, filed Sep. 29, 2011, entitled, "Providing Multiple Decode Options for a System-On-Chip (SoC) Fabric", by Sridhar Lakshmanamurthy, et al.

U.S. Appl. No. 13/248,270, filed Sep. 29, 2011, entitled, "Supporting Multiple Channels of a Single Interface", by Sridhar Lakshmanamurthy, et al.

U.S. Appl. No. 13/248,276, filed Sep. 29, 2011, entitled, "Issuing Requests to a Fabric", by Sridhar Lakshmanamurthy, et al.

U.S. Appl. No. 13/222,362, filed Aug. 31, 2011, entitled, "Integrating Intellectual Property (IP) Blocks Into a Processor", by Prashanth Nimmala, et al.

U.S. Appl. No. 13/306,244, filed Nov. 29, 2011, entitled, "Providing a Sideband Message Interface for System on a Chip (SoC)", by Robert P. Adler, et al.

U.S. Appl. No. 13/222,354, filed Aug. 31, 2011, entitled, "Providing Adaptive Bandwidth Allocation for a Fixed Priority Arbiter", by Kie Woon Lim, et al.

International Searching Authority, "Notification of Transmittal of the International Search Report and the Written Opinion of the International Searching Authority," mailed Dec. 26, 2012, in International application No. PCT/US2012/056399.

* cited by examiner

SENDING PACKETS WITH EXPANDED HEADERS

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC.

To enable routing packets through a system, typically a header is provided with the packet that includes information to aid in routing and decoding the packet. Different communication protocols provide for different header arrangements. However, these header formats are typically fixed and prevent flexibility to provide additional information by way of the header. In tunneling protocols, in which different agents communicate using multiple communication protocols, an original packet can be encapsulated into a packet type with an additional header for the tunneling protocol. In turn, each agent can access a packet header that it can comprehend. But this technique increases packet size and decoding complexity.

DETAILED DESCRIPTION

Figure 1:
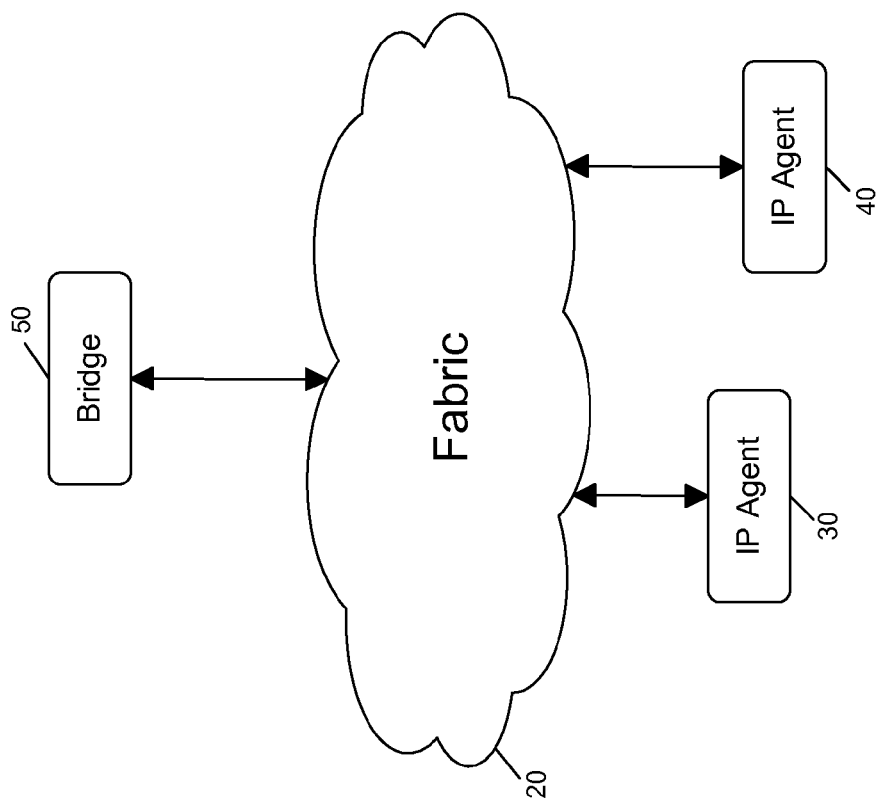
FIG. 1 is a block diagram of a basic interconnect architecture in accordance with an embodiment of the present invention.

A sideband interface that couples different components, referred to as agents, may be configured to provide a capability to send additional header information within a sideband message in such a way that routing fabrics can remain completely agnostic to this information and only specific target agents can comprehend such an extended header. By adding the ability to send an expanded header for a given message, arbitrary length expansion of a standard header, e.g., 1 doubleword (DW), of an interface specification can be realized. At the same time, a router, switch or other interfacing component may process an incoming message based on the standard header (e.g., by inspecting the first 1 DW of the header). In addition, embodiments provide a simple packet layout and decoding scheme so that receiving agents can discard or strip expanded headers when they are not supported by the agent (e.g., treating the expanded header as a don't care) as a message streams into the agent.

By providing an expanded header mechanism in accordance with an embodiment of the present invention, a receiving agent that does not support such information can thus ignore it in received messages. This allows reduction of design complexity in master and target agents. As an example, consider the case of sending security attribute information (SAI) in an expanded header. A master agent can implement a configuration in which it always sends SAIs in all transactions. Such a master agent is also more secure since sending of SAIs can be hardcoded and security vulnerabilities from a possible configurable SAI header insertion is avoided. If a transaction having a SAI expanded header is destined to a target agent that is configured to enforce access control policy, the target agent may use the SAI information in that header. If instead the transaction is destined to a target agent that has no resources configured for access control protection, that agent can ignore the expanded header and process the standard message header and corresponding message payload.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
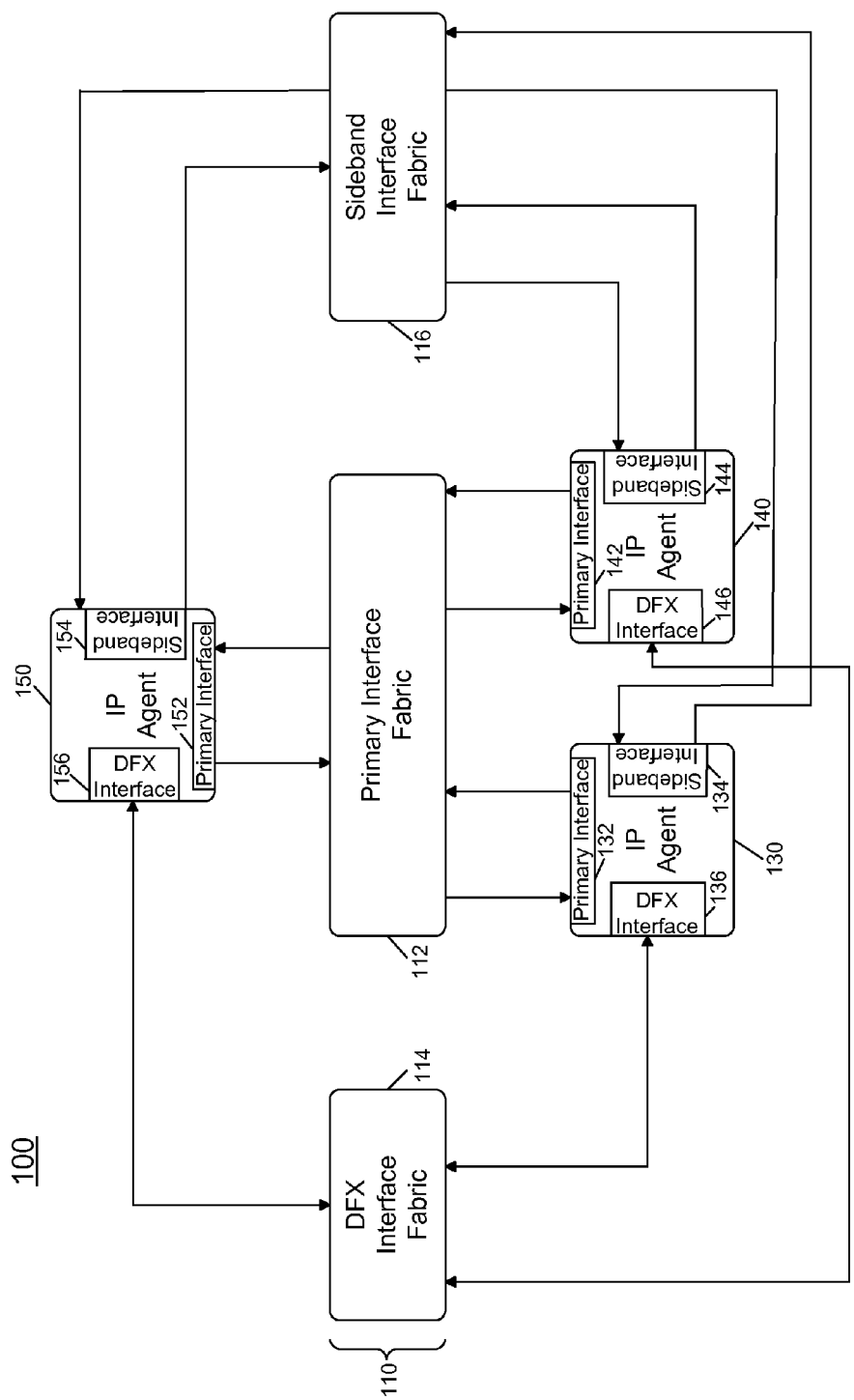
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
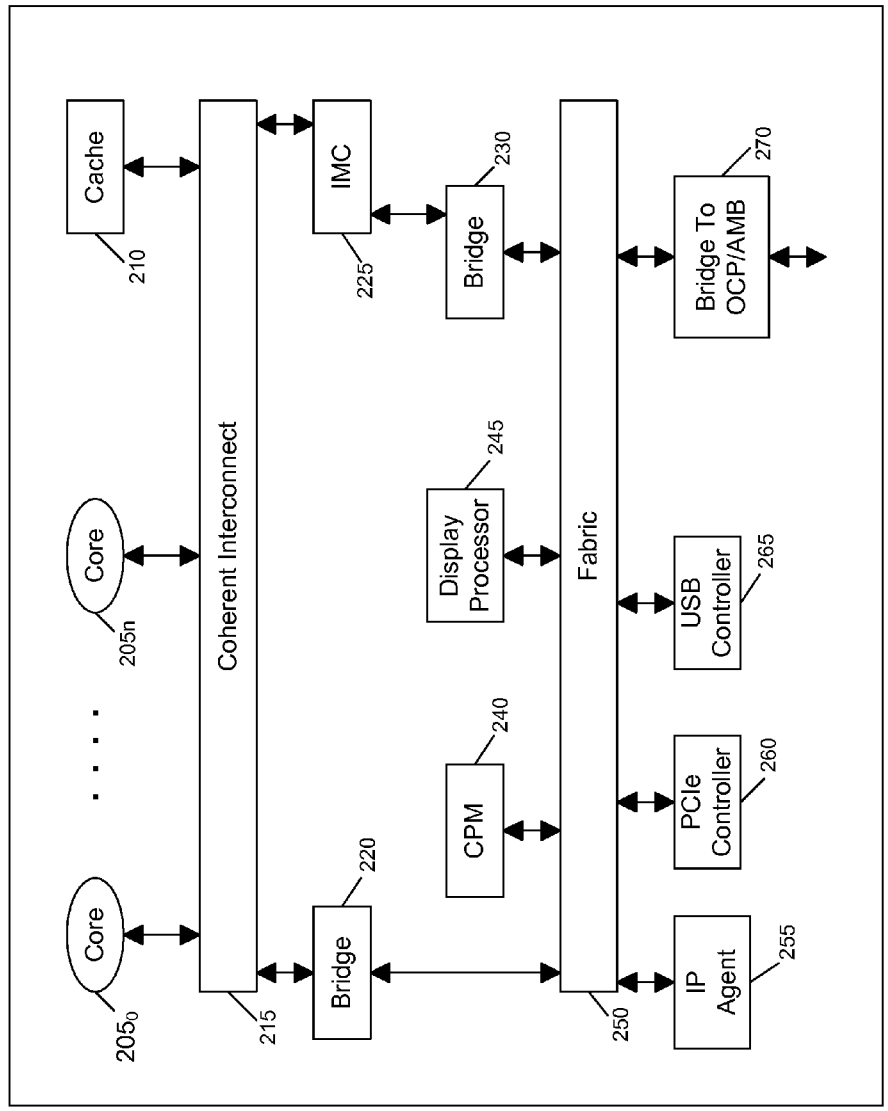
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
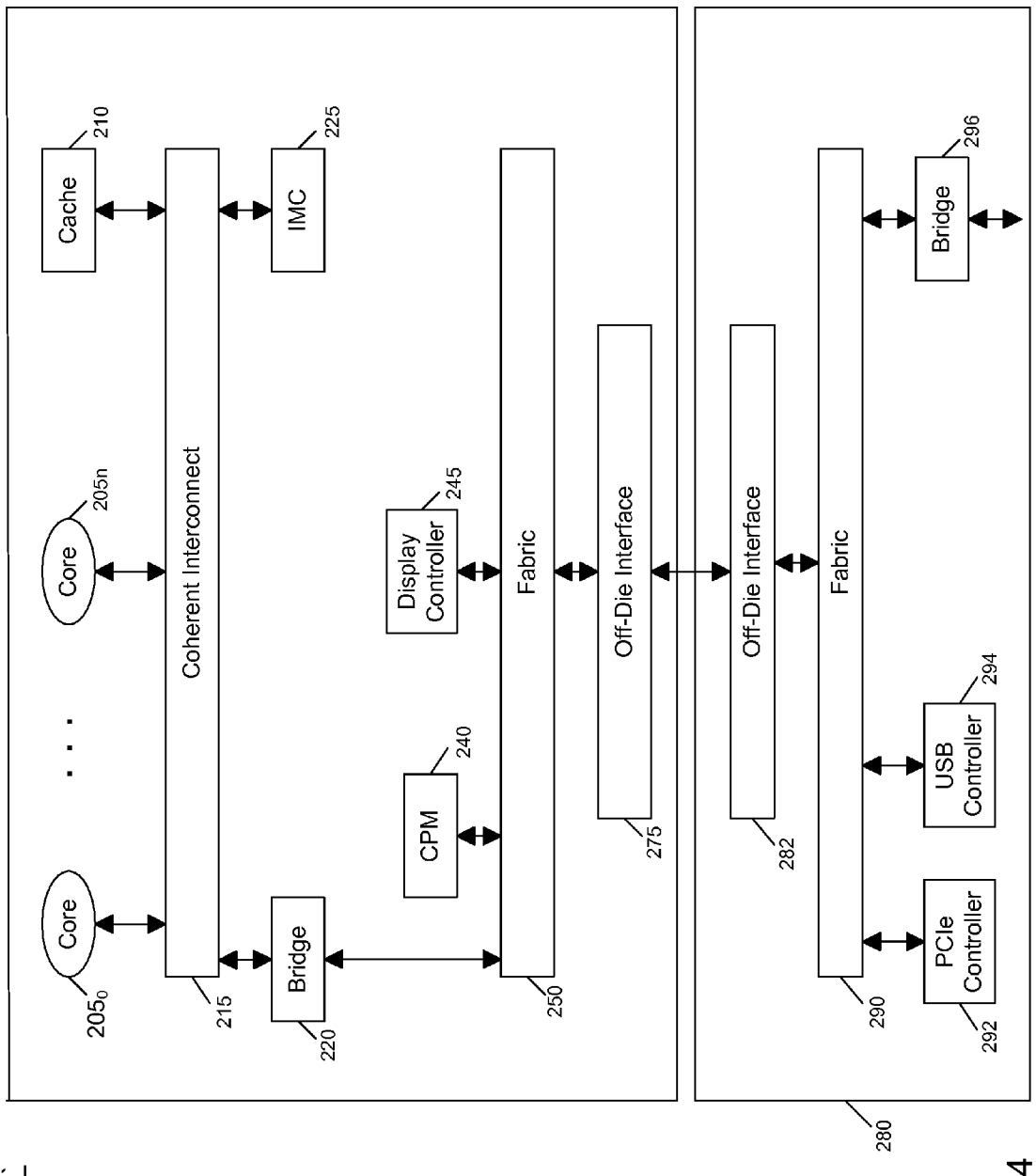
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
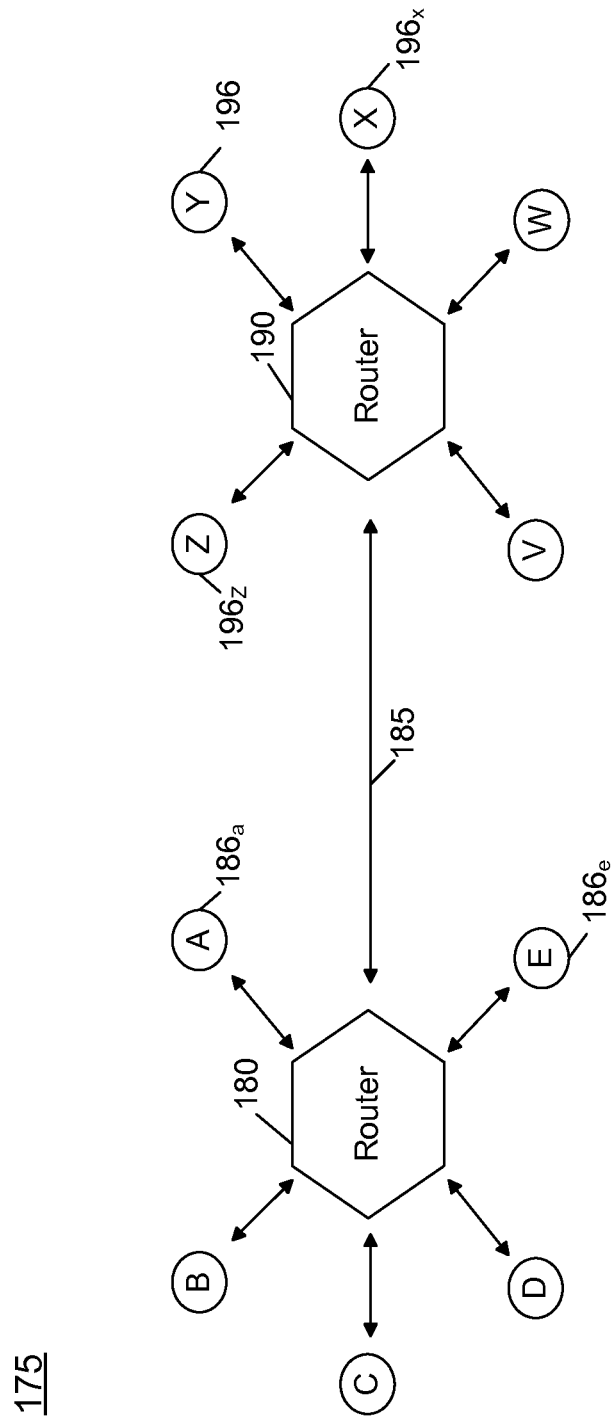
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

Figure 6:
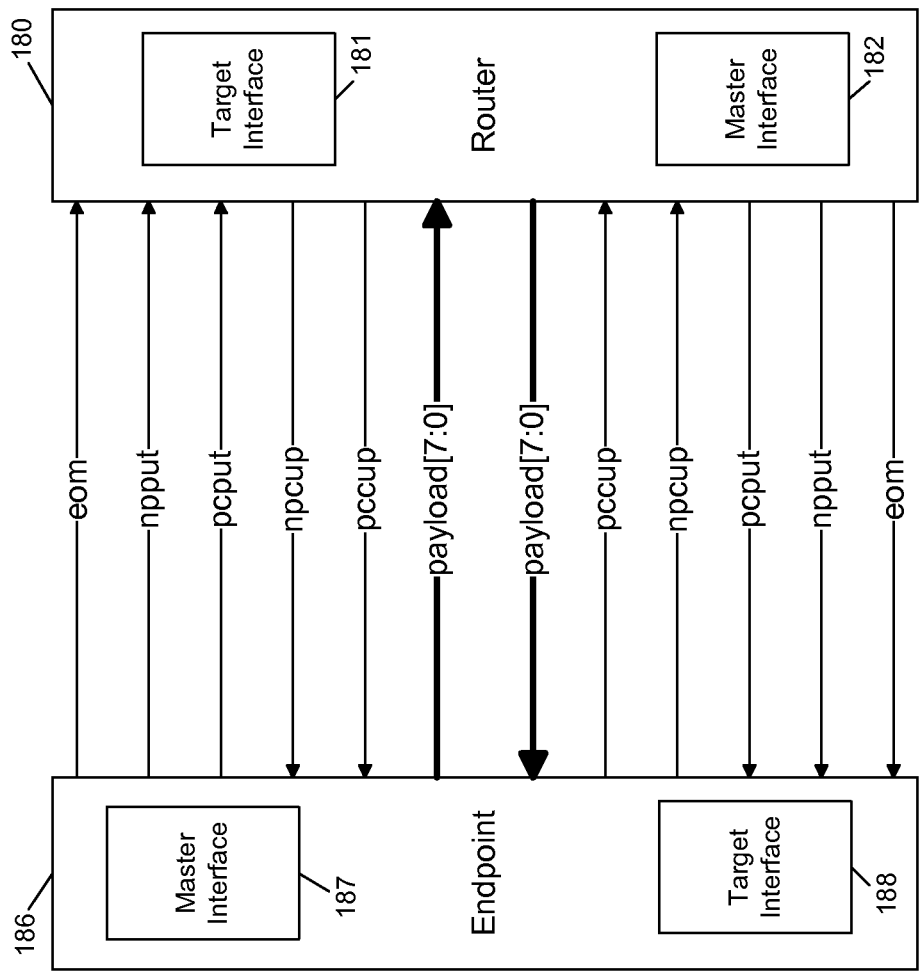
FIG. 6 is a block diagram of details of signaling available for a sideband interface in accordance with an embodiment of the present invention.

Referring now to FIG. 6, shown is a block diagram of details of signaling available for a sideband interface in accordance with an embodiment of the present invention. As shown in FIG. 6, interconnection between a router 180 and an endpoint 186 is shown. As seen, router 180 may include a target interface 181 and a master interface 182. In general, target interface 181 may be configured to receive incoming signals, while master interface 182 may be configured to transmit outgoing signals. As seen, endpoint 186 also includes a master interface 187 and a target interface 188.

FIG. 6 further shows details of the various signaling available for the sideband interface, including credit information, put information, end of message signaling, and data. Specifically, credit updates can be communicated via sideband interfaces as a non-posted credit update signal (NPCUP) and a posted credit update signal (PCCUP). In addition, put signals may be provided (NPPUT and PCPUT). In addition, an end of message (EOM) signal can be communicated. Finally, data may be communicated via payload packets which in one embodiment can be implemented via a byte-wide communication channel. Although shown with this particular implementation in the embodiment of FIG. 6, the scope of the present invention is not limited in this regard. Whenever a credit Put signal is high, this means that a credit is being returned. Whenever a put signal is high, it means that the payload (e.g., data) signal is valid. Whenever a Put and EOM are high at the same time, it means that the current payload is the last payload of the message. Note that the interface can both "put" a data payload and "put" a credit in the same clock cycle.

In various implementations, sideband messages may carry additional header information in one or more expanded headers. As used herein the term "additional header information" is used to refer to greater amounts of information (and potentially of different types) and/or different arrangement than information present in a standard header according to a given interface specification. In one embodiment, each expanded header can be a length of a conventional header, which in the embodiment described herein is one DW in length. The number of expanded headers in a message can be product specific. Different agents in a system may initiate messages expanded with a different number of expanded headers. To identify the presence of an expanded header, in some embodiments an expanded header (EH) indicator, e.g., a single bit, can be present in the standard header of every message to indicate the presence of an optional expanded header, namely the addition of another header of the standard header length. In turn, an EH indicator in every expanded header indicates the presence of a subsequent expanded header of the standard header length. If present, one or more expanded headers can be appended after the standard header (e.g., after the first DW in a system having a DW standard header length).

Figure 7:
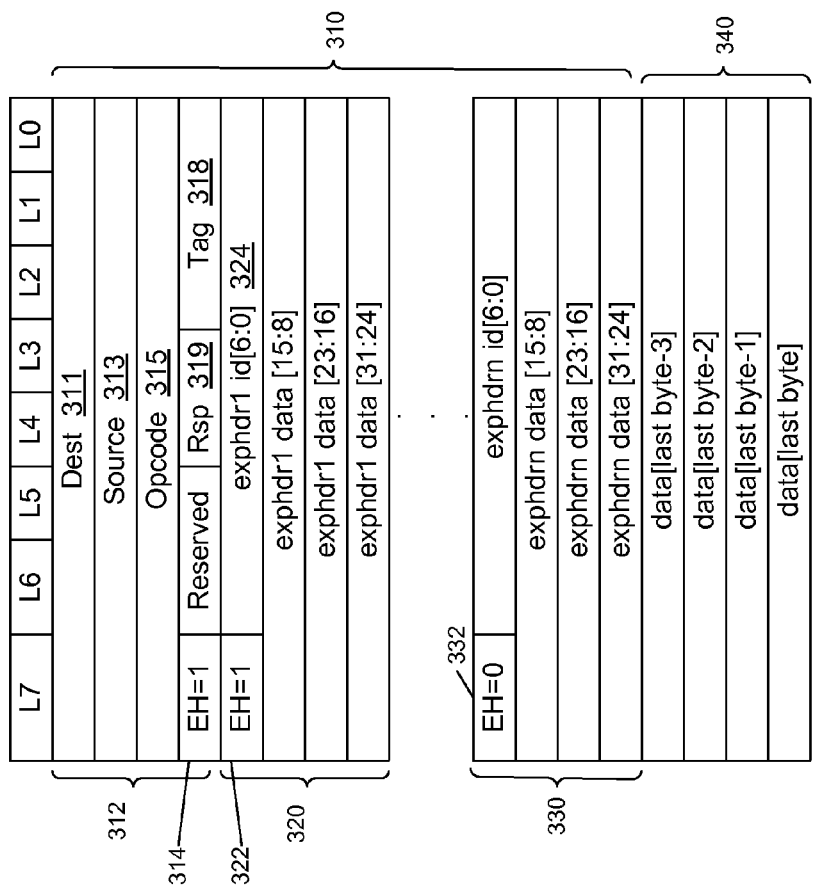
FIG. 7 is an illustration of a message having a header portion and a data portion in accordance with one embodiment of the present invention.

FIG. 7 illustrates a message 300 having a header portion 310 and a data portion 340, where the header portion 310 can include up to N expanded headers. All other sideband messages follow the same expanded header format.

As shown in the example of FIG. 7, an EH indicator 314 is set in a first header 312 which may be a standard header of the IOSF specification to indicate the presence of a first expanded header ((ExpHdr1)) 320. As seen in FIG. 7, first header 312 includes various additional fields, including a destination field 311, a source field 313, an opcode field 315, a tag field 318 and a response field 319. As seen in the FIG. 7 embodiment, EH indicator 314 may be present in a last flow control unit (flit) of the header, namely a most significant bit (MSB) of this flit, although the scope of the present invention is not limited in this regard.

In various embodiments, for each expanded header that follows the first header, its EH indicator may instead be present within the first flit of the corresponding expanded header. Thus as seen in FIG. 7, first expanded header 320 includes an EH indicator 322 present in the first flit of the header 320, along with a header identifier field (e.g., a header ID) 324. The expanded header ID field 324, ExpHdr ID[6:0], may identify the specific header extension ID. In various embodiments, the identifier may indicate a particular type of expanded header determined according to the IOSF specification, rather than being specific to the agent generating the header. As an example, the IOSF specification currently defines an expanded header identifier for purposes of providing SAI, and in one embodiment the expanded header field may have a binary value of 0000000. If an agent receives an expanded header with an ID of 0000000, it knows that the data contained within that expanded header is an SAI.

Setting the EH indicator in the first expanded header (ExpHdr1) indicates the presence of a second expanded header, and so forth. The EH indicator 332 in the last expanded header (ExpHdrN) 330 is not set, indicating that the current expanded header is the last expanded header. As seen in FIG. 7, data payload flits start after the last expanded header 330.

All target agents, regardless of whether they interpret any expanded header content, can be configured to comprehend message formatting with expanded headers present, and further to support the ability to distinguish expanded headers from message and data payload. Any expanded header with an ExpHdr ID field that is not supported by a target agent can be dropped, not alias to a supported ExpHdr ID, and not affect the agent's processing of the received message. In various embodiments, routers can be configured to use only the standard header (e.g., the first header DW) to determine the message type and route it to its target agent. To maintain accuracy within a system, the routers may further be configured to forward messages with expanded headers without changing any attributes in the expanded headers.

Figure 8:
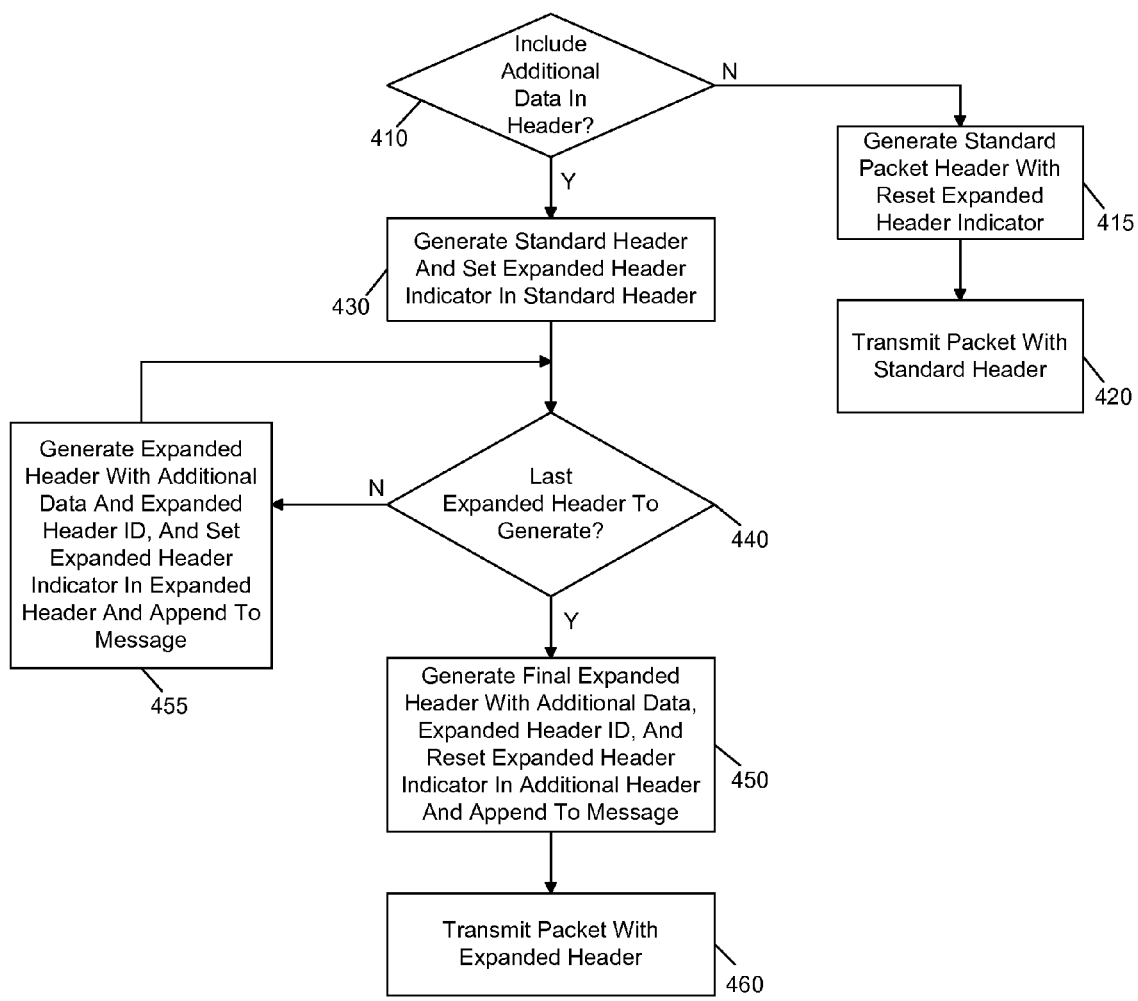
FIG. 8 is a flow diagram of a method for generating a packet in accordance with an embodiment of the present invention.

Referring now to FIG. 8, shown is a flow diagram of a method for generating a packet in accordance with an embodiment of the present invention. More specifically, method 400 of FIG. 8 may be used by an agent to generate a sideband packet having an expanded header. As seen, method 400 may begin by determining whether to include additional data in a header portion of a packet (diamond 410). If not, a standard packet header is generated with an expanded header indicator having a reset value (block 415). Thus, this reset value indicates that the packet is of a standard header length. Accordingly, at block 420, the packet can be transmitted with a standard header.

If instead at diamond 410 it is determined to include additional data in the header, control passes to block 430 where a standard header is generated and furthermore, this header is generated having an expanded header indicator having a set value. By way of this set value, it indicates to a receiver of the packet that additional header information is present in the packet. Control then passes to diamond 440 where it can be determined whether this is the last expanded header to be generated. If so, control passes to block 450, where a single additional header can be generated and appended to the message. More specifically, this additional header may include additional data and an expanded header identifier, e.g., to identify the type of data present in the expanded header. Also, this additional header may include a reset expanded header indicator to thus indicate that no further expanded headers are to be communicated for this packet. Accordingly, control passes to block 460 where the packet can be transmitted with the expanded header (in addition to its standard packet and payload data).

If instead at diamond 440 it is determined that this is not the last expanded header, control passes to block 455. There, a header can be generated having additional data and an expanded header identifier. Furthermore, the additional header can have a set expanded header indicator and be appended to the message. Control then passes to diamond 440, as discussed above. Although shown with this particular implementation in the embodiment of FIG. 8, understand the scope of the present invention is not limited in this regard.

Figure 9:
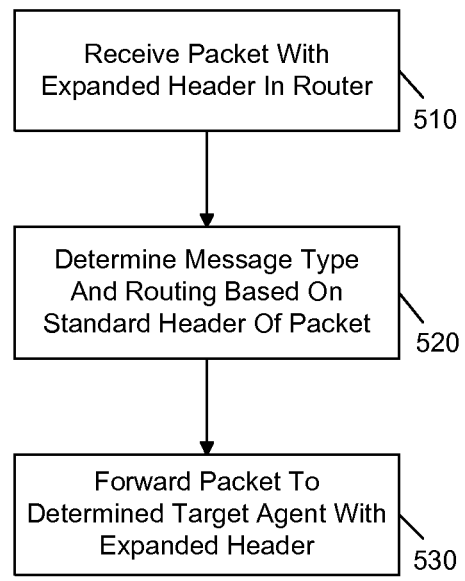
FIG. 9 is a flow diagram of a method for handling a packet having an expanded header in a router in accordance with an embodiment of the present invention.

As discussed above, a router that receives a packet having an expanded header need not be able to handle or support the information in the expanded header, and instead can forward the packet along to its target destination based solely on the information present in the standard header portion of the packet. Referring now to FIG. 9, shown is a flow diagram of a method for handling a packet having an expanded header in a router in accordance with an embodiment of the present invention. As shown in FIG. 9, method 500 may begin by receiving a packet with an expanded header (block 510). The router then may determine a message type, e.g., based on information present in the standard header and furthermore can determine routing based on information present in the standard header, such as a destination identifier field of the standard header (block 520). Accordingly, at block 530 the packet can be forwarded to the determined agent with the expanded header. Thus even though the router may not contemplate or support the information present in the expanded header portion, it can still process information present in the standard header to enable forwarding the packet to its appropriate destination.

Figure 10:
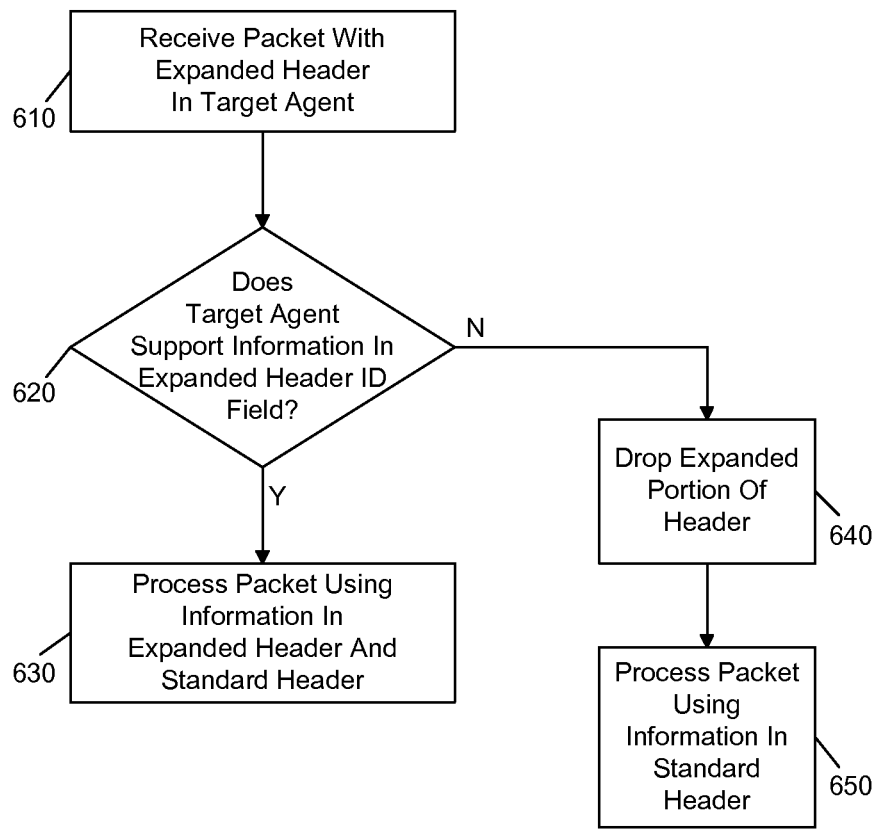
FIG. 10 is a flow diagram of a method of processing a packet including an expanded header in a target agent in accordance with one embodiment of the present invention.

As also discussed above, in many embodiments a receiver of a packet having an expanded header need not be able to support the information present in the expanded header, enabling more efficient reuse of various IP agents. Referring now to FIG. 10, shown is a flow diagram of a method of processing a packet including an expanded header in a target agent. As seen in FIG. 10, method 600 may begin by receiving a packet having an expanded header in a target agent (block 610). Next it can be determined whether the target agent supports the information present in the expanded header. More specifically, at diamond 620 it can be determined based on information in the expanded header identifier field whether the target agent can support the information present in the one or more expanded headers. If so, control passes to block 630 where the packet can be processed by the target agent using, at least in part, the information present in the expanded header and the standard header. If instead it is determined at diamond 620 that the target agent does not support the information in the expanded header, control passes to block 640. There the expanded portion of the header (whether it be one or more expanded header portions) can be dropped and accordingly, control passes to block 650 where the packet can be processed using information in the standard header.

Note that in some implementations where multiple expanded headers are sent in a single packet, a target agent can support information present in at least one of the expanded headers but not in other expanded headers. Accordingly, in such situations, the target agent can use information present in any expanded header information that it supports, e.g., based on the expanded header identifier fields of the expanded headers. Although shown with this particular implementation in the embodiment of FIG. 10, understand the scope of the present invention is not limited in this regard.

Rather than providing additional header information through an encapsulation mechanism, embodiments can provide for an expanded header that is always in the same location in every packet, yet still allows for arbitrary length header length expansion Embodiments thus enable routing fabrics to be agnostic to an expanded header, and further to enable target agents to completely ignore the expanded header during receiver processing of messages. This is contrasted to the Internet Protocol (IP), in which each layer of an IP stick will insert an additional header inside existing headers such that each layer must "peel the onion" in order to process a packet at any given layer of the protocol stack. In contrast, using an expanded header mechanism in accordance with an embodiment of the present invention a router is guaranteed to only have to process the standard packet header (e.g., the first DW) and an expanded header is guaranteed to begin at a predetermined location (e.g., starting at DW 2). In this way, hardware can be supplied in furtherance of an on-die, message-based interconnect.

Figure 11:
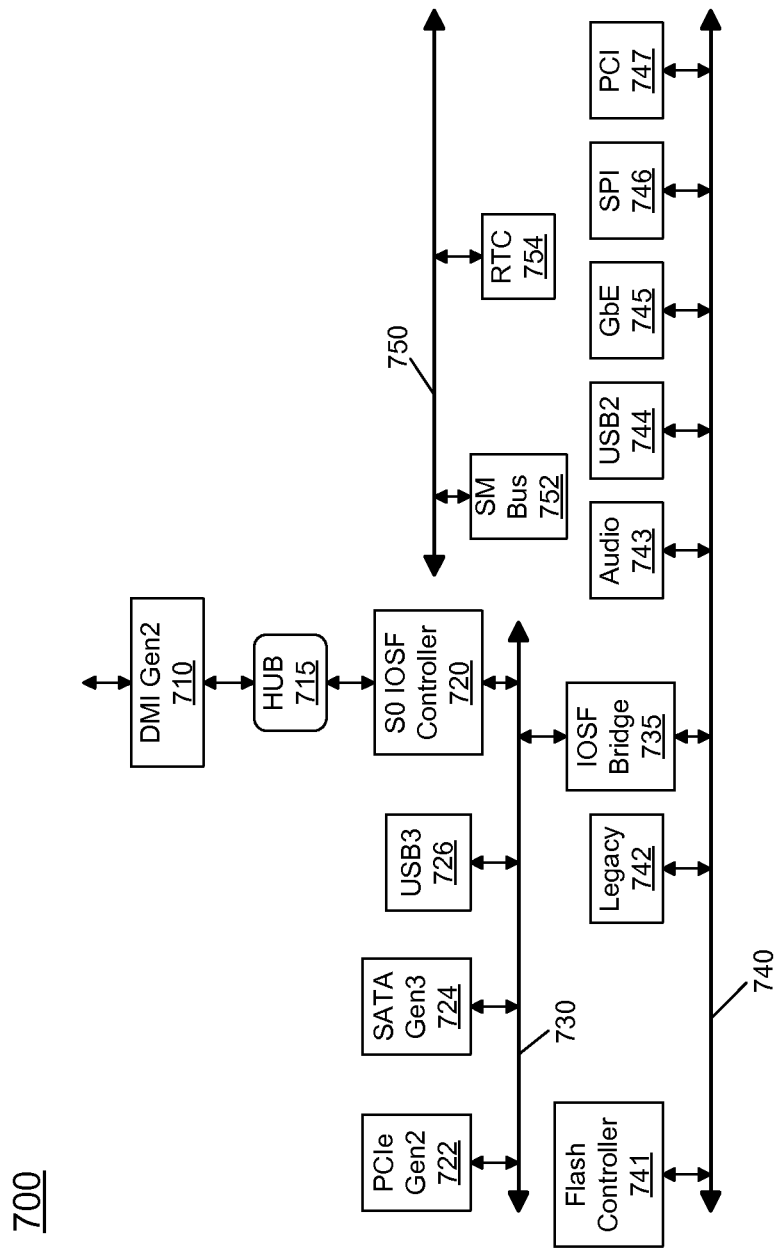
FIG. 11 is a more detailed block diagram of a portion of a SoC in accordance with an embodiment of the present invention.

Although the SoCs of FIGS. 3 and 4 are at a high level, understand that additional functionality may be present. Referring now to FIG. 11, shown is a more detailed block diagram of a portion of a SoC in accordance with an embodiment of the present invention. As shown in FIG. 11, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 11, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 7, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 11, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 11, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 11, understand the scope of the present invention is not limited in this regard.

Figure 12:
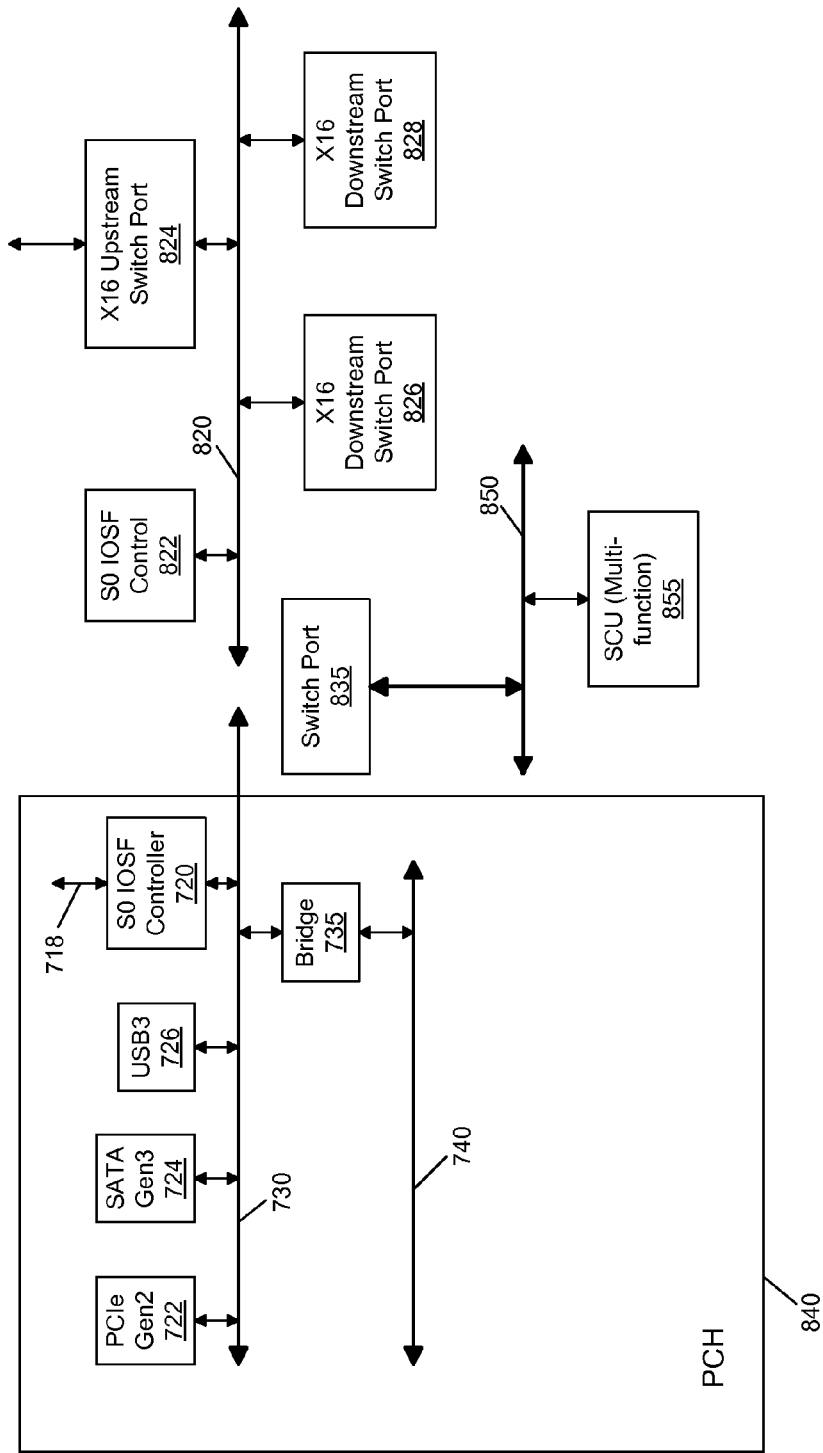
FIG. 12 is a block diagram of another SoC in accordance with an embodiment the present invention

Still other implementations are possible. Referring now to FIG. 12, shown is a block diagram of another SoC in accordance with an embodiment the present invention. As shown in FIG. 12, SoC 800 may be configured for use, e.g., in server systems. As seen in FIG. 12, SoC may include a platform controller hub (PCH) 840, which may generally include components such as seen in the embodiment of FIG. 11. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 12).

As further seen in FIG. 12, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
  receiving a packet in a sideband interface of a first agent, the sideband interface coupled to a router that receives the packet from a second agent, wherein the first and second agents and the router are of a system-on-chip (SoC), the packet including a first packet header having an expanded header indicator to indicate presence of an additional packet header in the packet;

determining if the packet includes at least one additional packet header based on the expanded header indicator of the first packet header; and if so, determining if the first agent supports information in the at least one additional packet header based on a header identifier of the at least one additional packet header.

2. The method of claim 1, further comprising handling the at least one additional packet header if the first agent supports the information, and otherwise dropping the at least one additional packet header.

3. The method of claim 2, further comprising handling the packet using the first packet header if the first agent does not support the information.

4. The method of claim 1, further comprising determining if the packet includes an $N^{th}$ additional packet header based on an expanded header indicator of an $N-1^{th}$ additional packet header.

5. The method of claim 1, further comprising consuming data in the at least one additional packet header in the first agent, the data including security attribute information to enable the first agent to perform access control protection.

6. The method of claim 5, further comprising not consuming security attribute information received in the second agent as an additional packet header for a second packet header, wherein the second agent does not support the security attribute information.

7. The method of claim 1, further comprising receiving the packet in the router coupled to a source agent and routing the packet to the first agent based on the first packet header, wherein the router is not configured to support the information in the at least one additional packet header.

8. The method of claim 1, wherein the header identifier is present in a header identifier field of the at least one additional header.

9. The method of claim 1, wherein at least one of the first and second agents is an intellectual property (IP) block of a third party.

10. The method of claim 1, further comprising forwarding the packet from the router to the first agent without modifying the information in the at least one additional header.

11. An article comprising a machine-accessible storage medium including instructions that when executed cause a system-on-chip (SoC) to:

determine if additional header information is to be included in a packet to be sent from a first agent;

if so, set an expanded header indicator of a first header of the packet to a first state to indicate the presence of a second header of the packet;

include at least a portion of the additional header information in the second header and an expanded header identifier in a first flow control unit of the second header, and include the additional header information in a plurality of flow control units of the second header following the first flow control unit; and send the packet including the first and second headers and a data portion from the first agent.

12. The article of claim 11, further comprising instructions that when executed enable the system to:

if the additional header information is sized to fit within the second header, set an expanded header indicator of the second header to a second state to indicate no further headers are included in the packet; and if the additional header information is not sized to fit within the second header, set the expanded header indicator of the second header to the first state to indicate the presence of a third header of the packet.

13. The article of claim 11, further comprising instructions that when executed enable the system to send the packet to a router coupled to the first agent via a sideband interface of the first agent, the packet destined for a second agent coupled to the router, wherein the first header includes a destination identifier for the second agent, wherein the first and second agents and the router are of the SoC.

14. The article of claim 12, wherein the additional header information includes security attribute information.

15. The article of claim 11, further comprising instructions that when executed enable the system to include a header identifier field in the second header to indicate a type of the second header.

16. An apparatus comprising:

a first agent to send a packet having additional header information, wherein the first agent is to set an expanded header indicator of a first header of the packet to indicate the presence of a second header of the packet, and to include at least a portion of the additional header information in the second header, and send the packet including the first and second headers and a data portion to a router via a sideband interface of the first agent;

the router coupled to the first agent to receive the packet and to route the packet to a second agent based on the first header; and the second agent coupled to the router.

17. The apparatus of claim 16, wherein the first agent is to reset an expanded header indicator of the second header if the additional header information is sized to fit within the second header and otherwise to set the expanded header indicator of the second header to indicate the presence of a third header of the packet including at least a portion of the additional header information.

18. The apparatus of claim 16, wherein the second agent is to consume data in the additional header information, the data including security attribute information, if the second agent is configured to process the security attribute information to enable the second agent to perform access control protection according to an access control policy, and otherwise drop the security attribute information.

* * * * *